United States Patent
Schaper

(10) Patent No.: US 11,719,225 B2
(45) Date of Patent: Aug. 8, 2023

(54) METHOD FOR SETTING A PITCH ANGLE OF A ROTOR BLADE, CONTROL DEVICE FOR SETTING A PITCH ANGLE, AND ASSOCIATED WIND TURBINE

(71) Applicant: Wobben Properties Gmbh, Aurich (DE)

(72) Inventor: Ulf Schaper, Staffhorst (DE)

(73) Assignee: Wobben Properties GmbH, Aurich (DE)

( * ) Notice: Subject to any disclaimer, the term of this patent is extended or adjusted under 35 U.S.C. 154(b) by 262 days.

(21) Appl. No.: 17/112,677

(22) Filed: Dec. 4, 2020

(65) Prior Publication Data

US 2021/0190036 A1 Jun. 24, 2021

(30) Foreign Application Priority Data

Dec. 20, 2019 (DE) ...................... 10 2019 135 550.8

(51) Int. Cl.
  *F03D 7/04* (2006.01)
  *F03D 7/02* (2006.01)

(52) U.S. Cl.
  CPC ........... *F03D 7/0224* (2013.01); *F03D 7/042* (2013.01); *F05B 2270/32* (2013.01); *F05B 2270/327* (2013.01); *F05B 2270/328* (2013.01); *F05B 2270/331* (2013.01)

(58) Field of Classification Search
  CPC .......................... F03D 7/0224; F05B 2270/328
  See application file for complete search history.

(56) References Cited

U.S. PATENT DOCUMENTS

| 8,523,520 | B2 * | 9/2013 | Nagasaki | ................. | H02P 9/04 |
| | | | | | 416/61 |
| 9,127,645 | B2 * | 9/2015 | Bertolotti | ................ | F03D 7/042 |
| 2012/0061962 | A1 * | 3/2012 | Nagasaki | ................. | H02P 9/04 |
| | | | | | 290/44 |
| 2012/0139248 | A1 * | 6/2012 | Bertolotti | ................ | F03D 7/042 |
| | | | | | 290/44 |

FOREIGN PATENT DOCUMENTS

| DE | 102009026372 A1 | 2/2011 |
| EP | 2 481 921 A2 | 8/2012 |
| EP | 3 109 461 A1 | 12/2016 |

OTHER PUBLICATIONS

Muljadi et al., "Pitch-Controlled Variable-Speed Wind Turbine Generation," IEEE Transactions on Industry Applications 37 (1): 240-246, Jan./Feb. 2001.

\* cited by examiner

*Primary Examiner* — Eldon T Brockman
(74) *Attorney, Agent, or Firm* — Seed Intellectual Property Law Group LLP

(57) ABSTRACT

A method for setting a pitch angle of a rotor blade for a rotor of a wind turbine, a control device for setting a pitch angle of a rotor blade for a rotor of a wind turbine, and a wind turbine. In particular, a method for setting a pitch angle of a rotor blade for a rotor of a wind turbine, in particular for avoiding suction-side flow separation, wherein the rotor blade is movable rotationally about a rotor blade longitudinal axis for setting the pitch angle by means of a pitch drive, comprising the steps: determining an aerodynamic power of the rotor, establishing a nominal pitch angle as a function of the aerodynamic power, and setting the pitch angle to the established nominal pitch angle.

17 Claims, 10 Drawing Sheets

METHOD FOR SETTING A PITCH ANGLE OF A ROTOR BLADE, CONTROL DEVICE FOR SETTING A PITCH ANGLE, AND ASSOCIATED WIND TURBINE

BACKGROUND

Technical Field

The disclosure concerns a method for setting a pitch angle of a rotor blade for a rotor of a wind turbine, a control device for setting a pitch angle of a rotor blade for a rotor of a wind turbine, and a wind turbine.

DESCRIPTION OF THE RELATED ART

Wind turbines are known in principle and generate electrical power from wind. Modern wind turbines are usually so-called horizontal axis wind turbines in which the rotor axis is arranged substantially horizontally and the rotor blades sweep a substantially vertical rotor field. Wind turbines also usually comprise, as well as a rotor arranged on a nacelle, a tower on which the nacelle with the rotor is arranged so as to be rotatable about an axis oriented substantially vertically. The rotor usually comprises one, two or more rotor blades of equal length. The rotor blades are slender components which are often made from fiber-reinforced plastic.

The rotor blades usually have a rotor blade longitudinal axis extending from a root region towards the rotor blade tip. Usually, the rotor blades are adjustable rotationally about this rotor blade longitudinal axis so as to be able to influence the angle of attack. The rotational adjustment of the rotor blades about the rotor blade longitudinal axis is usually performed by means of a so-called pitch drive. The pitch drive is usually situated in the hub of a rotor on which the rotor blade is arranged. The pitch drive usually comprises an electric drive and a drive pinion which meshes with a toothing of the rotor blade and thus allows a rotational adjustment of the rotor blade.

The primary objectives of adjusting the pitch angle are to regulate the rotation speed for a nominal wind and to aerodynamically stop the turbine, which also includes an emergency stop. The purpose of adjusting the pitch angle is furthermore to set an angle of attack such that no flow separation occurs either on the pressure side or on the suction side of the rotor blade. Despite these adjustment possibilities, flow separations frequently occur, in particular on the suction side of rotor blades. Such flow separations on the suction side occur because, amongst other factors, the aerodynamic peripheral conditions are not static but change continuously, so that rapid and continuous adjustment of the pitch angle would be necessary. Such a rapid adjustment of the pitch angle is not however possible, or only possible within restrictions, with the control technology currently used. Inter alia, this leads to a restricted power capacity of the wind turbine which in particular results in a non-optimal conversion of the wind into electrical power.

BRIEF SUMMARY

Provided is a method for setting a pitch angle of a rotor blade for a rotor of a wind turbine, a control device for setting a pitch angle of a rotor blade for a rotor of a wind turbine, and a wind turbine. Provided are one or more techniques which allows a higher efficiency of a wind turbine, in particular for low air density.

According to a first aspect, provided is a method for setting a pitch angle of a rotor blade for a rotor of a wind turbine, in particular for avoiding suction-side flow separation, wherein the rotor blade is movable rotationally about a rotor blade longitudinal axis for setting the pitch angle by means of a pitch drive, comprising the steps: determining an aerodynamic power of the rotor, establishing a nominal pitch angle as a function of the aerodynamic power, and setting the pitch angle to the established nominal pitch angle.

The pitch angle in particular describes an angle between a chord of the rotor blade and the wind incidence direction. The pitch angle is usually adjustable by means of a pitch drive. Using the pitch drive, the rotor blade can be moved rotationally about the rotor blade longitudinal axis. The rotational movement of the rotor about its rotor blade longitudinal axis adjusts the pitch angle.

The method comprises the step of determining the aerodynamic power of the rotor. The aerodynamic power may, for example, be determined via the rotor moment. In particular, it is preferred that the aerodynamic power is considered indirectly. As will be explained in more detail below, the aerodynamic power may also be determined from the electrical power.

In a further step, the method comprises establishing the nominal pitch angle as a function of the aerodynamic power. The nominal pitch angle is in particular a prescribed value for the pitch angle which is substantially optimal in aerodynamic respects, taking into account the aerodynamic power.

The method furthermore comprises the step of setting the pitch angle to the established nominal pitch angle. This means in particular that the pitch angle is adjusted from a set pitch angle value to the nominal pitch angle. For this, preferably the pitch drive is actuated to move the rotor blade rotationally about its rotor blade longitudinal axis.

The disclosure is based on the knowledge that with the known method for controlling the pitch angle based on the electrical power, considerable delays occur in setting the pitch angle. One reason for this delay is that the electrical power of a wind turbine is typically selected as a function of the rotor rotation speed, which however, because of the rotor inertia, only rises after a delay when an increased aerodynamic power is present at the rotor.

In addition, the reasons already cited in the text apply. Delays lead, for example, to a phase offset which limits the permitted extent of feedback amplification. For example, the slower the power controller reacts to a rotation speed rise by increasing the turbine power, the smaller usually the changes in nominal pitch angle must be for the control loop to remain stable and substantially avoid unstable and/or oscillating system operation.

In addition, a pitch system with low adjustment speed means that only slight changes in nominal pitch angle with respect to time are possible. The disclosure is furthermore based on the knowledge that the phase offset between the electrical power and the aerodynamic power leads to a system with slow adjustment capacity.

By taking into account the aerodynamic power instead of the electrical power, steeper nominal pitch angle gradients are possible. Steeper nominal pitch angle gradients are advantageous since, using these, adjustment takes place only above a higher first limit power in order to set a defined nominal pitch angle at a second limit power. Accordingly, with steeper nominal pitch angle gradients, the wind turbine can be operated with economically advantageous peripheral conditions over a wider operating range. A steeper nominal pitch angle gradient allows the first limit power, above which adjustment takes place, to lie closer to the second limit power at which, for aerodynamic reasons, a pitch angle must be achieved. By increasing the first limit power therefore, the lower power range in which the wind turbine can be operated at its optimum rotor efficiency, is extended. There is thus a shorter time delay when aerodynamic power is used in comparison with electrical power for setting the pitch angle. The earlier reaction of the pitch system to a change in wind speed, in particular to a gust, allows greater reactions without reaching the stability limits of the control system.

In this way, an earlier reaction of the pitch drive to changed aerodynamic peripheral conditions is possible. This is particularly important at low air density and/or in turbulent wind conditions. At low air density, which typically occurs in mountain locations, the energy content of an air flow is smaller for the same wind speed than at a location with normal air density. This means that the same aerodynamic power is available only at a higher wind speed in a location with low air density. An increase in wind speed increases the angle of attack of a rotor blade and hence also the risk of flow separation. Usually, for locations with low air density, this is countered by a blade angle adjustment. Precisely then a greater reaction of the pitch drive is possible without reaching the stability limits of the control system. The inventors have found that the nominal pitch angle gradients can be more than doubled if, instead of electrical power, the aerodynamic power is used as a basis for establishing the nominal pitch angle.

According to a preferred refinement of the method, it is provided that the aerodynamic power is established from a generated electrical power, a power loss and/or an acceleration power of the rotor, wherein preferably the aerodynamic power is the sum of the electrical power, the power loss and the acceleration power.

The electrical power preferably generated by the rotor may be the electrical power of the wind turbine fed to the network. Alternatively, the generated electrical power may be the electrical power measured at the generator output. The power loss may, for example, be due to friction losses, transmission losses and similar causes of loss known in the field of wind energy. The acceleration power of the rotor is established, as explained in more detail below, in particular by the inertia moment of the rotor. Depending on whether the rotor undergoes a negative or positive acceleration with respect to its angular speed, the acceleration power is either positive or negative. In order to determine the aerodynamic power, preferably the sum of the electrical power, the power loss and the acceleration power is formed.

According to a further preferred refinement of the method, it is provided that the power loss is formed from the sum of a measurable power loss and an estimated power loss, wherein preferably the estimated power loss is established by multiplying an estimation parameter by the electrical power.

Such an estimation parameter corresponds to an assumed efficiency. Power losses which cannot be measured directly include, for example, switching losses and semiconductor switch elements, and ohmic losses on assemblies whose electrical resistance is not known to the control system. The actual power loss which cannot be measured can be estimated with at least sufficient accuracy via an assumed efficiency, e.g., "99.5%."

In a preferred embodiment variant of the method, it is furthermore provided that the acceleration power is established from an inertia moment of the rotor, an angular speed and/or an angular acceleration, wherein preferably the acceleration power is established by multiplying the inertia moment of the rotor by the angular speed and/or angular acceleration.

The acceleration power temporarily stored mechanically in the rotor by a change in the rotational pulse is here detected by measuring the angular speed and measuring the angular acceleration, wherein the angular speed and angular acceleration are multiplied by the inertia moment of the rotor.

In a further preferred refinement of the method, it is provided that the nominal pitch angle is formed from an adjustment gradient, wherein the adjustment gradient is formed from the pitch angle and the aerodynamic power.

The adjustment gradient preferably describes how quickly the pitch angle is adjusted depending on a changed aerodynamic power. As already described above, it is particularly preferred that steep adjustment gradients are used at which nonetheless a stable control loop is achieved. The adjustment gradient is preferably less than 10°, in particular less than or equal to 9°, per megawatt (MW). It is furthermore preferred if the adjustment gradient is more than 3° per megawatt. For a turbine with rotor diameter of approximately 100 meters at standard air density, for example, adjustment gradients of around 3° per megawatt are preferred. In high mountain locations, for example, adjustment gradients of up to 9° per megawatt are proposed. The adjustment gradients depend amongst others on the aerodynamic design of the rotor blades and are usually lower for larger installations.

The nominal pitch angle is preferably formed by multiplying the adjustment gradient by a specific aerodynamic power.

In addition, it is preferred that the nominal pitch angle is established on the basis of an aerodynamic power factor depicted in a portionally linear control function, wherein the portions of the portionally linear control function are defined by the aerodynamic power, and preferably the aerodynamic power factor is a power-dependent additional blade angle.

A portionally linear control function describes, for example, a first linear portion and a second linear portion. The first linear portion of the nominal pitch angle runs in particular in a first portion of an aerodynamic power, for example, between 2000 kW (kilowatts) and 3000 kW. In addition, the portionally linear control function is preferably defined for a second portion of the aerodynamic power, for example, for an aerodynamic power between 3000 and 5000 kW. The aerodynamic power factor of the first portion may differ from an aerodynamic power factor of the second portion.

According to a further preferred embodiment variant of the method, it is provided that a minimum pitch angle is taken into account when establishing the nominal pitch angle, wherein preferably the minimum pitch angle and the aerodynamic power factor, in particular the power-dependent additional blade angle, are taken into account, wherein furthermore preferably the minimum pitch angle and the aerodynamic power factor, in particular the power-dependent additional blade angle, are added together in order to establish the nominal pitch angle.

In a wind turbine with two or more rotor blades, the pitch angle preferably means a collective pitch angle. In the partial load region in particular, the two or more rotor blades are usually adjusted collectively so that the pitch angle at the two or more rotor blades is substantially the same.

The minimum pitch angle is, for example, a pitch angle which is set at low aerodynamic power levels. In particular, it is a pitch angle which is set at aerodynamic power levels which lie below a first power threshold value.

In a further preferred refinement of the method, it is provided that the portionally linear function has a first portion, a second portion and preferably a third portion, wherein the first portion is defined for an aerodynamic power which is less than a first power threshold value, wherein the nominal pitch angle in the first portion corresponds substantially to the minimum pitch angle.

Preferably, it is provided that the second portion is defined for an aerodynamic power which is greater than or equal to the first power threshold value and less than a second power threshold value, wherein the nominal pitch angle in the second portion is a sum of the minimum pitch angle and a first aerodynamic power factor, wherein preferably the first aerodynamic power factor is established as a function of a first adjustment gradient and/or the aerodynamic power and/or the first power threshold value.

In addition, it may be preferred that the third portion is defined for an aerodynamic power which is greater than or equal to the second power threshold value, wherein the nominal pitch angle in the third portion is the sum of the minimum pitch angle and a second aerodynamic power factor, wherein preferably the second aerodynamic power factor is established as a function of a second adjustment gradient and/or the aerodynamic power and/or the second power threshold value and/or the first adjustment gradient and/or a difference between the second power threshold value and the first power threshold value.

It is preferred that the first power threshold value lies between 40% and 62.5% of a rated output of the wind turbine, in particular between 47.5% and 52.5%, and particularly preferably is approximately 50%. It is furthermore preferred that the second power threshold value lies between 62.5% and 87.5% of the rated output of the wind turbine, in particular between 70% and 80%, and particularly preferably is approximately 75%.

Thus for example, for a typical wind turbine in the rated output range from 3500 kW to 4000 kW, it is preferred that the first power threshold value lies between 1500 kW and 2500 kW, in particular preferably between 1900 kW and 2100 kW. It is furthermore preferred that the second power threshold value lies between 2500 kW and 3500 kW, in particular preferably between 2900 kW and 3100 kW.

The power threshold values above which the blade angle interventions begin should be selected such that interventions occur only in the wind speed range in which the turbine rotation speed can no longer be increased proportionally to the wind speed. At the same time, the power threshold values must be set sufficiently low so that, in the context of the adjustment gradients to be applied for stability of the control system, sufficiently large pitch angles can be achieved with a high turbine power. A compromise must be found between the two contradictory objectives.

The first adjustment gradient and/or the second adjustment gradient are each a gradient of the pitch angle and the aerodynamic power. The first adjustment gradient and/or the second adjustment gradient are thus a measure of the gradient of the curve representing the pitch angle as a function of the aerodynamic power.

A further preferred embodiment variant of the method is distinguished in that the nominal pitch angle is established with the following portionally linear control function:

$$\alpha = \alpha_{min} + \begin{Bmatrix} 0, \text{ if } P_{aero} < P_{min,1}, \\ \frac{\partial \alpha}{\partial P_1} * (P_{aero} - P_{min,1}), \text{ if } P_{min,1} \leq P_{aero} < P_{min,2}, \\ \frac{\partial \alpha}{\partial P_1} * (P_{min,2} - P_{min,1}) + \frac{\partial \alpha}{\partial P_2} * (P_{aero} - P_{min,2}), \text{ if } P_{min,2} \leq P_{aero} \end{Bmatrix},$$

wherein $\alpha$ is the nominal pitch angle, $\alpha_{min}$ the minimum pitch angle, $P_{aero}$ the aerodynamic power, $P_{min,1}$ the first power threshold value, $P_{min,2}$ the second power threshold value, $$\frac{\partial \alpha}{\partial P_1}$$

a first adjustment gradient and $$\frac{\partial \alpha}{\partial P_2}$$

a second adjustment gradient.

It is preferred that at least one signal, in particular the signal characterizing the angular acceleration, is filtered. This may prevent known interference being coupled back to the pitch angle. This concerns, for example, high-frequency interference or known rotor harmonics.

In a further preferred refinement of the method, it is provided that the pitch angle is only set to the established nominal pitch angle if the difference between the established nominal pitch angle and a set pitch angle is greater than a minimum setting angle.

The minimum setting angle is established from the established nominal pitch angle minus the set pitch angle value. The set pitch angle value represents a pitch angle set at the wind turbine, for example, at the time of establishing the nominal pitch angle and/or directly before setting the pitch angle to the established nominal pitch angle.

It is particularly preferred that the difference between the established nominal pitch angle and the set pitch angle value is taken into account. This method variant has the advantage that the pitch angle is not constantly corrected. This would lead to an unnecessary operation with little economic benefit. In addition, the wear on the wind turbine would be increased. It is therefore proposed that a minimum travel distance be defined.

The amount of the minimum setting angle is preferably between 0.1° and 0.3°, in particular between 0.15° and 0.25°.

In a further preferred refinement of the method, it is provided that the nominal pitch angle is established as a function of the aerodynamic power in an upper partial load range, wherein the upper partial load range lies between a full load range and a lower partial load range.

The upper partial load range lies between the full load range and the lower partial load range. The full load range is distinguished in particular in that the wind turbine is operated with nominal rotation speed and/or rated output.

The lower partial load range is distinguished in particular in that in this range, a significantly lower power is generated than in the full load range. For example, the power generated in the lower partial load range may be less than 60%, less than 50% or less than 40% of the rated output.

The upper partial load range is characterized in particular in that the rotation speed does not increase substantially as the wind speed rises but remains substantially constant. "Substantially" here means, for example, that the rotation speed increases by less than 10% or less than 20% from the lower end of the upper partial load range to the upper end of the upper partial load range.

The lower partial load range, the upper partial load range and/or the full load range may be defined by the aerodynamic power or by the electrical power.

According to a further aspect, provided is a control device for setting a pitch angle of a rotor blade for a rotor of a wind turbine, which is configured to establish a nominal pitch angle as a function of an aerodynamic power of the rotor and to actuate a pitch drive for setting the pitch angle of the rotor blade such that the pitch angle is set to the established nominal pitch angle by means of the pitch drive.

To establish the nominal pitch angle, the control device may, for example, comprise a calculation unit. Furthermore preferably, the control device may comprise a memory unit coupled to the calculation unit. The control device is preferably configured to execute the portionally linear control function defined above.

The control unit is furthermore preferably coupled to further control units and/or measuring systems so that the control device can be provided, for example, with the electrical power, the power loss and/or the acceleration power of the rotor. In addition, the control device is preferably configured to determine the power loss from the electrical power provided. The acceleration power may also be established by the control device, for example, from the provided wind speed and/or angular acceleration of the rotor.

The control device may be or become coupled to the pitch drive for signal transmission in order to actuate this. The pitch drive may be actuated by a provision of the nominal pitch angle. The control device may, for example, be configured to actively control the pitch drive. In addition, the control device may also act passively, so that, for example, the pitch drive retrieves the nominal pitch angle from the control device.

In a preferred refinement of the control device, it is provided that the nominal pitch angle is formed from an adjustment gradient, wherein the adjustment gradient is formed from a pitch angle and the aerodynamic power.

It is furthermore preferred that the control device is coupled to a pitch drive for signal transmission for adjusting a set pitch angle of the rotor blade, and wherein the control device provides the nominal pitch angle to the pitch drive.

In a particularly preferred embodiment variant of the control device, it is provided that this comprises a controller structure which is configured to control the pitch angle on the basis of the nominal pitch angle, wherein the controller structure has at least a first unit for determining the aerodynamic power and a second unit for establishing the nominal pitch angle as a function of the aerodynamic power.

According to a further aspect, provided is a wind turbine with a rotor having an adjustable-pitch rotor blade, wherein a pitch angle of the rotor blade can be set by means of a pitch drive, wherein the wind turbine is configured to execute a method according to any of the embodiment variants described above, and/or comprising a control device according to any of embodiment variants described above, wherein the control device is coupled to the pitch drive for signal transmission and is configured to provide the pitch drive with a nominal pitch angle which has been established as a function of an aerodynamic power, wherein the pitch drive sets the pitch angle on the basis of the nominal pitch angle.

For further advantages, embodiment variants and design details of the further aspects and their possible refinements, reference is made to the description above with respect to the corresponding features and refinements of the method for setting a pitch angle of a rotor blade for a rotor of a wind turbine.

BRIEF DESCRIPTION OF THE SEVERAL VIEWS OF THE DRAWINGS

Preferred exemplary embodiments are explained as an example with reference to the appended figures. The drawings show.

In the figures, the same elements or those with substantially the same or similar function are designated with the same reference signs.

DETAILED DESCRIPTION

Figure 1:
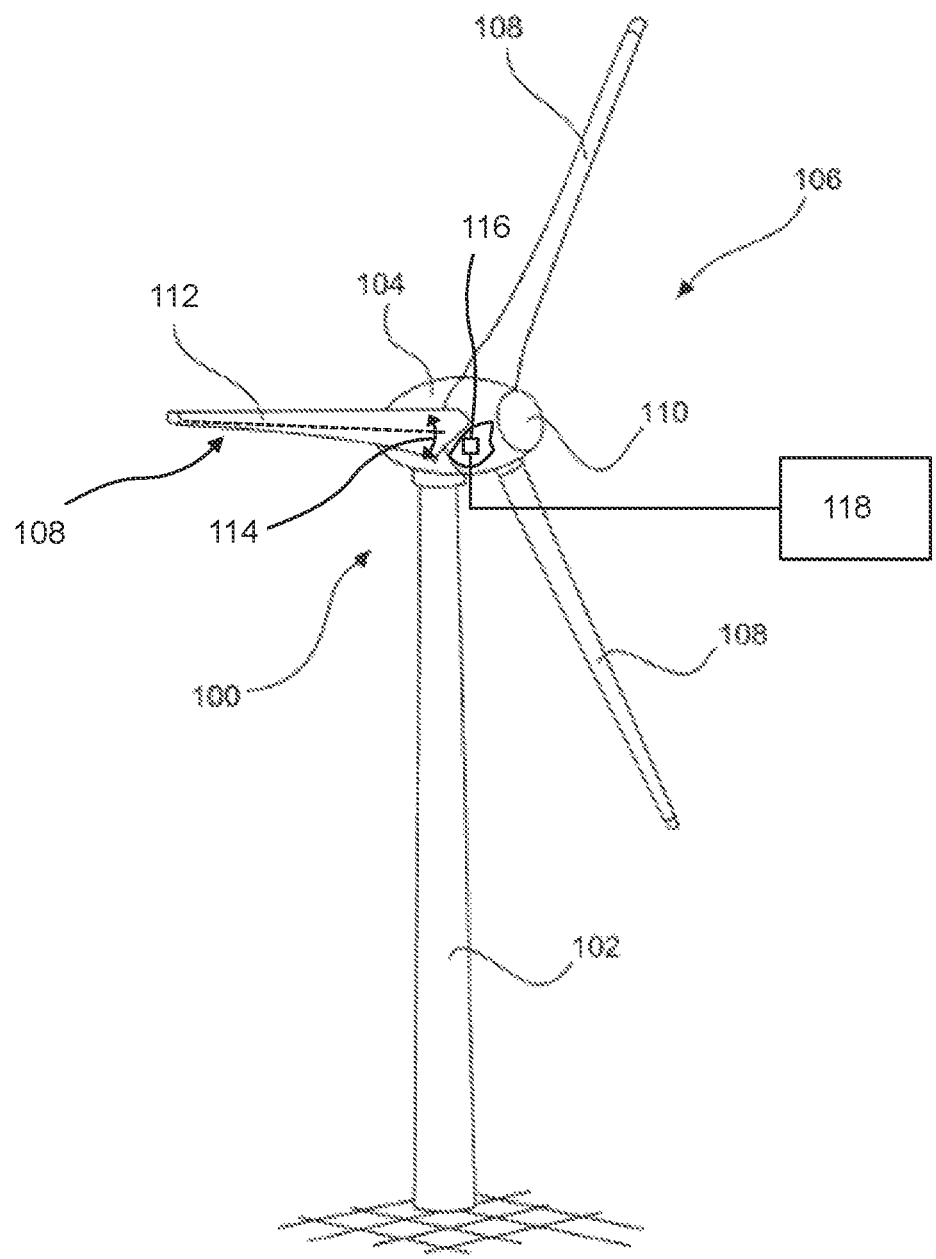
FIG. 1 shows a diagrammatic, three-dimensional view of an exemplary embodiment of a wind turbine.

FIG. 1 shows a diagrammatic, three-dimensional view of a wind turbine 100. The wind turbine 100 has a tower 102 and a nacelle 104 on the tower 102. An aerodynamic rotor 106 with three rotor blades 108, each having a rotor blade length, and a spinner 110 are provided on the nacelle 104. The aerodynamic rotor 106 is set in rotational movement by the wind during operation of the wind turbine 100 and thus also turns an electrodynamic rotor of a generator which is coupled directly or indirectly to the aerodynamic rotor 106. The electrical generator is arranged in the nacelle 104 and generates electrical energy.

The rotor blades 108 each have a rotor blade longitudinal axis 112. The rotor blade longitudinal axis 112 extends substantially from a root region of the rotor blade facing the nacelle 104 to a rotor blade tip facing away from the nacelle 104. The rotor blades 108 are arranged so as to be rotationally movable around the rotor blade longitudinal axis 112. In particular, a pitch angle 114 can be set by the rotational movement of the rotor blades 108 about the rotor blade longitudinal axis 112.

To set the pitch angle 114, the wind turbine 100 has pitch drives 116. The pitch drives 116 couple the rotor blades 108 to the nacelle 104. Furthermore, the pitch drives 116 are arranged such that they can achieve a rotational movement of the rotor blades 108 about their rotor blade longitudinal axis 112. The wind turbine 100 furthermore comprises a control device 118. The control device 118 is configured for setting the pitch angle 114 of the rotor blades 108. In particular, the control device 118 is configured for establishing a nominal pitch angle as a function of an aerodynamic power of the rotor 106, and actuating the pitch drive 116 to adjust the pitch angle 114 such that the pitch angle 114 is set to the established nominal pitch angle by means of the pitch drive 116.

The wind turbine 100 is furthermore configured to perform a method for setting the pitch angle 114 of at least one rotor blade 108 for the rotor 106. This method is suitable in particular for avoiding a suction-side flow separation, as will be explained in more detail below. The method comprises the steps: determining an aerodynamic power of the rotor 106 and/or at least one rotor blade 108, determining a nominal pitch angle as a function of the aerodynamic power, and setting the pitch angle 114 to the established nominal pitch angle.

Figure 2:
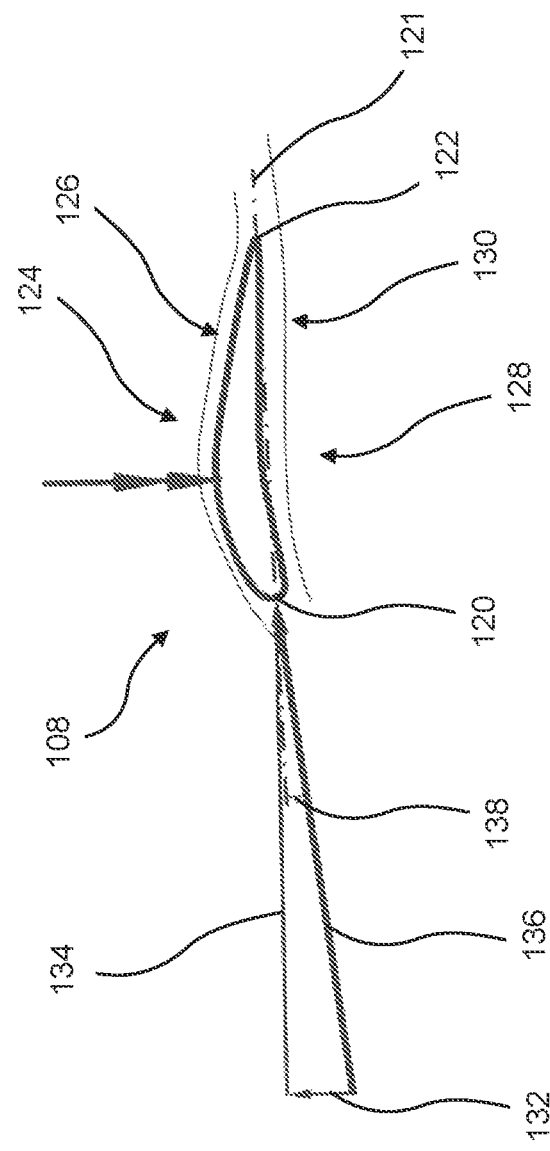
FIGS. 2-4 show diagrammatic, two-dimensional views of exemplary flow states on a rotor blade.
Figure 3:
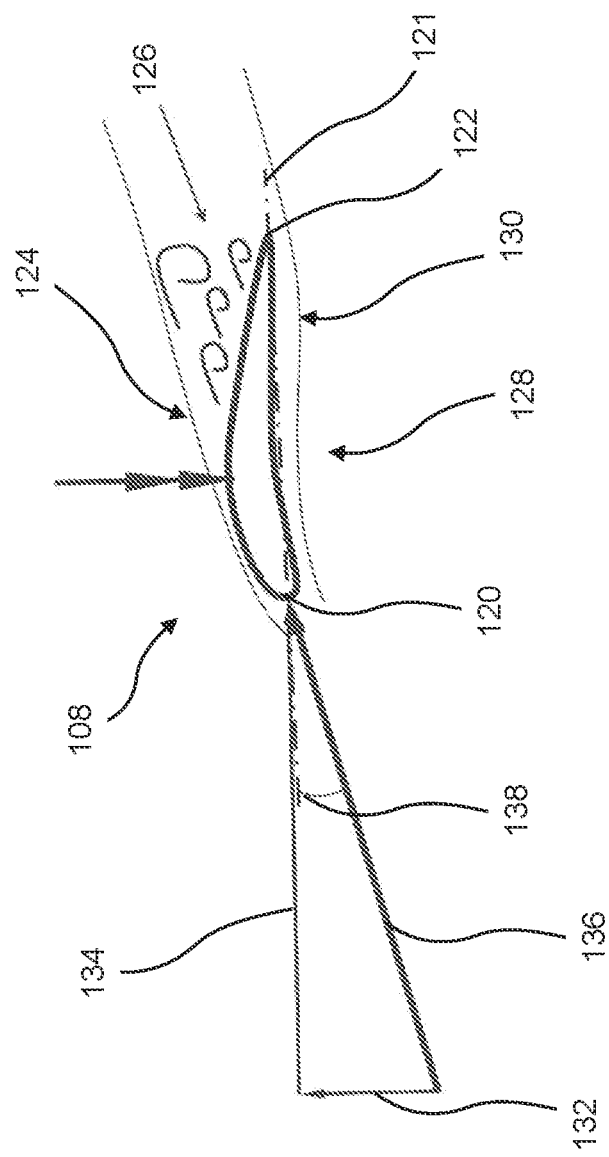
Figure 4:
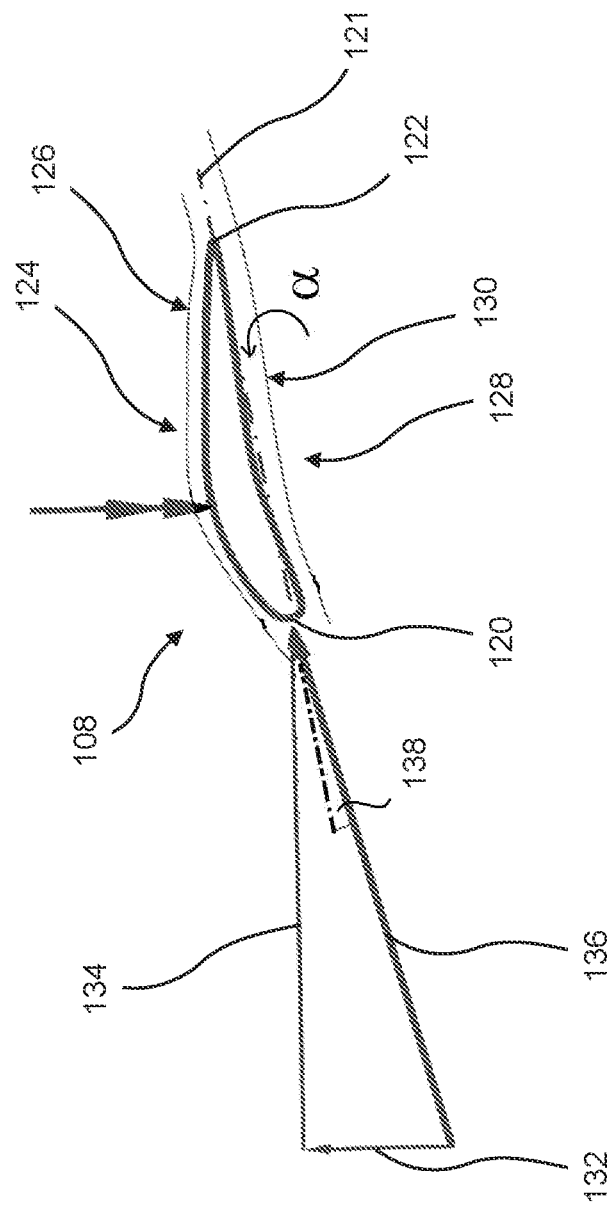

FIGS. 2 to 4 show diagrammatic, two-dimensional views of exemplary flow states at a rotor blade. The rotor blade 108 extends, in the direction of its profile depth, from a leading edge 120 to a trailing edge 122. The rotor blade 108 has a suction side 124 and a pressure side 128. During operation, an increased pressure prevails on the pressure side 128 and a reduced pressure on the suction side 124. Because of the increased pressure and reduced pressure, the rotor blade is set in motion. A suction-side flow 126 prevails on the suction side 124. A pressure-side flow 130 prevails on the pressure side 128.

The flows 126, 130 are produced by a wind hitting the rotor blade 108. At the rotor blade 108, the wind has a contact flow speed 136 which is composed of the circumferential speed 134 and the wind speed 132. The angle of attack 138 is set between the direction of the contact flow speed 136 and a profile chord 121. The profile chord 121 extends from the leading edge 120 to the trailing edge 122.

FIG. 3 shows the flow situation for a higher wind speed 132. Because the rotation speed and hence the circumferential speed 134 remain substantially constant, the angle of attack 138 changes. Accordingly, the direction of the contact flow speed 136 changes. The increase in angle of attack 138 promotes a flow separation on the suction side 124. The separation takes place physically by a pressure rise in the region close to the surface. The pressure rise in particular means a delay in the suction-side flow 126, sapping kinetic energy inside the boundary layer. This leads to a faster reduction in speed in the region close to the surface, usually resulting in a correspondingly greater pressure rise.

This phenomenon may be countered if the pitch angle α is changed as shown in FIG. 4. By changing the pitch angle α, i.e., by changing the angle between the profile chord 121 and the direction of the wind 132, the angle of attack 138 may be reduced again. Because the angle of attack 138 is reduced, the suction-side flow 126 again flows around the suction side 124 without separation.

Figure 5:
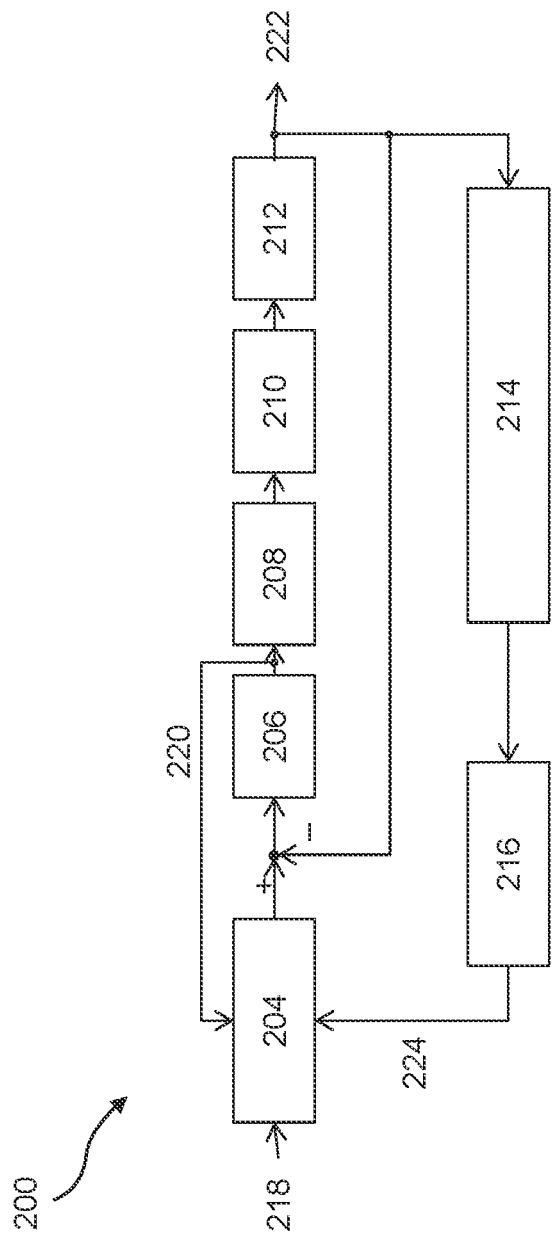
FIG. 5 show a diagrammatic view of a controller structure for setting the pitch angle as known in the prior art.

FIG. 5 shows a diagrammatic view of a controller structure known from the prior art for setting a pitch angle. The angle of attack 204 is influenced by a wind speed 218, a rotation speed 220 and hence a circumferential speed, and by the pitch angle 224. In the controller structure shown here, as known from the prior art, the angle of attack 204 is adjusted via the pitch angle 224 in that the necessary pitch angle is determined via an electrical power 222.

For this, the controller structure 200 comprises determination of the rotor inertia 206 and measurement of the rotation speed 208. Following a power specification 210, power regulation 212 takes place. The power regulation 212 determines a nominal blade angle 214 which is supplied to the pitch system 216. From this, the pitch angle 224 to be set is determined. Controlling the pitch angle 224 by means of the electrical power 222 leads to perceptible delays. These delays arise, for example, from the pitch system 216, the power regulation 212, the rotation speed measurement 208 and the rotor inertia 206.

These delays in the controller structure 200 shown lead to a phase offset which limits the permitted extent of feedback amplification. For example, the slower the power regulator 212 reacts to a rotation speed rise by increasing the electrical power 222, usually the smaller the changes in the determination of the nominal blade angle 214 must be for the controller structure to remain stable.

Figure 6:
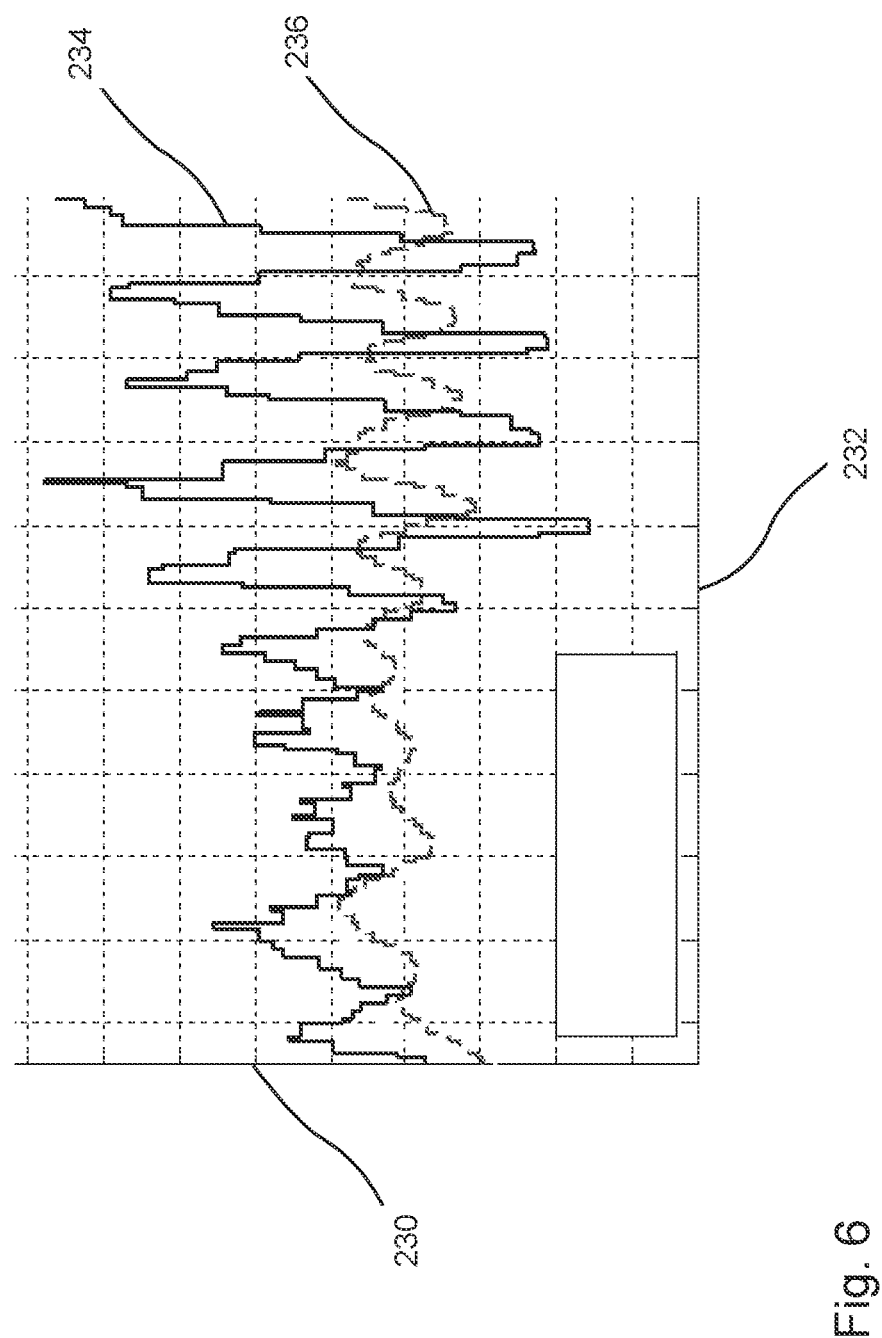
FIG. 6 shows an exemplary diagram of a power curve over time.

Because of these delays, the phase shift shown in FIG. 6 occurs between the aerodynamic power 234 and electrical power 236. Here the abscissa shows the time 232 and the ordinate shows the power 230. It is evident that a phase shift of around 90° exists between the aerodynamic power and the electrical power. This phase offset leads to a non-optimal setting of the pitch angle. This phenomenon is relevant in particular in the upper partial load range 246 shown in FIG. 7. This is because the rotation speed is here substantially constant, so that in the aerodynamic model the circumferential speed is also substantially constant.

Figure 7:
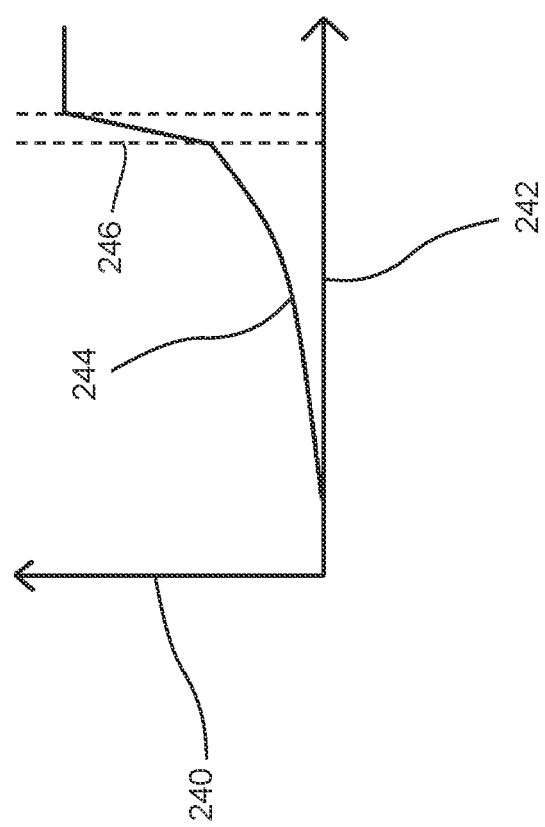
FIG. 7 shows a schematic diagram to illustrate load regions.
Figure 8:
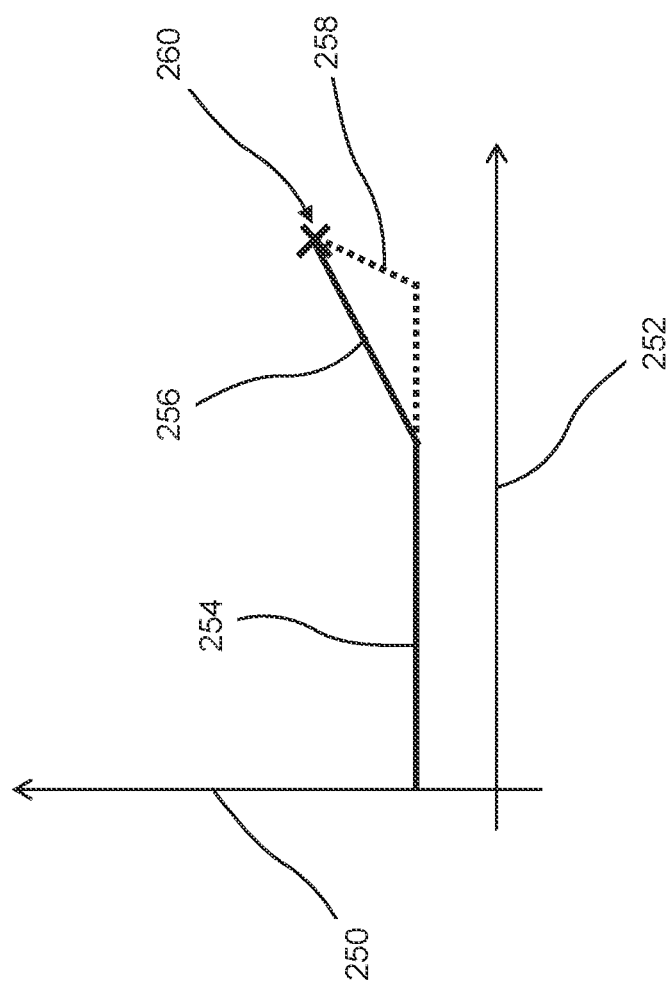
FIG. 8 shows an exemplary diagram to illustrate adjustment gradients.

The rotation speed-power curve 244 depicted in FIG. 7 shows the power 240 as a function of a rotation speed 242. In the upper partial load region 246, the power 240 rises greatly while the rotation speed 242 remains substantially constant. Because of the delays, setting a nominal pitch angle is also associated with delays. This phenomenon is evident in particular from FIG. 8. Here the power 252 is shown over a pitch angle 250. The pitch angle curve 254 shows two different characteristics. There are two different adjustment gradients 256, 258 for reaching a nominal pitch angle 260.

Because of the delays, only a low first adjustment gradient 256 is possible. By means of the aspects described above, the second adjustment gradient 258 can be implemented. In particular, this higher second adjustment gradient 258 is possible by setting the nominal pitch angle, in particular for determining an adjustment gradient, on the basis of the aerodynamic power and not the electrical power. It is evident from FIG. 8 that pitch adjustment takes place only above a higher limit power in order to achieve a pitch angle required at a limit power. This is made possible in particular because of the steeper second adjustment gradient 258. In this way, with steeper adjustment gradients, the wind turbine may be operated with economically advantageous low pitch angles over a greater operating range of the installation.

Figure 9:
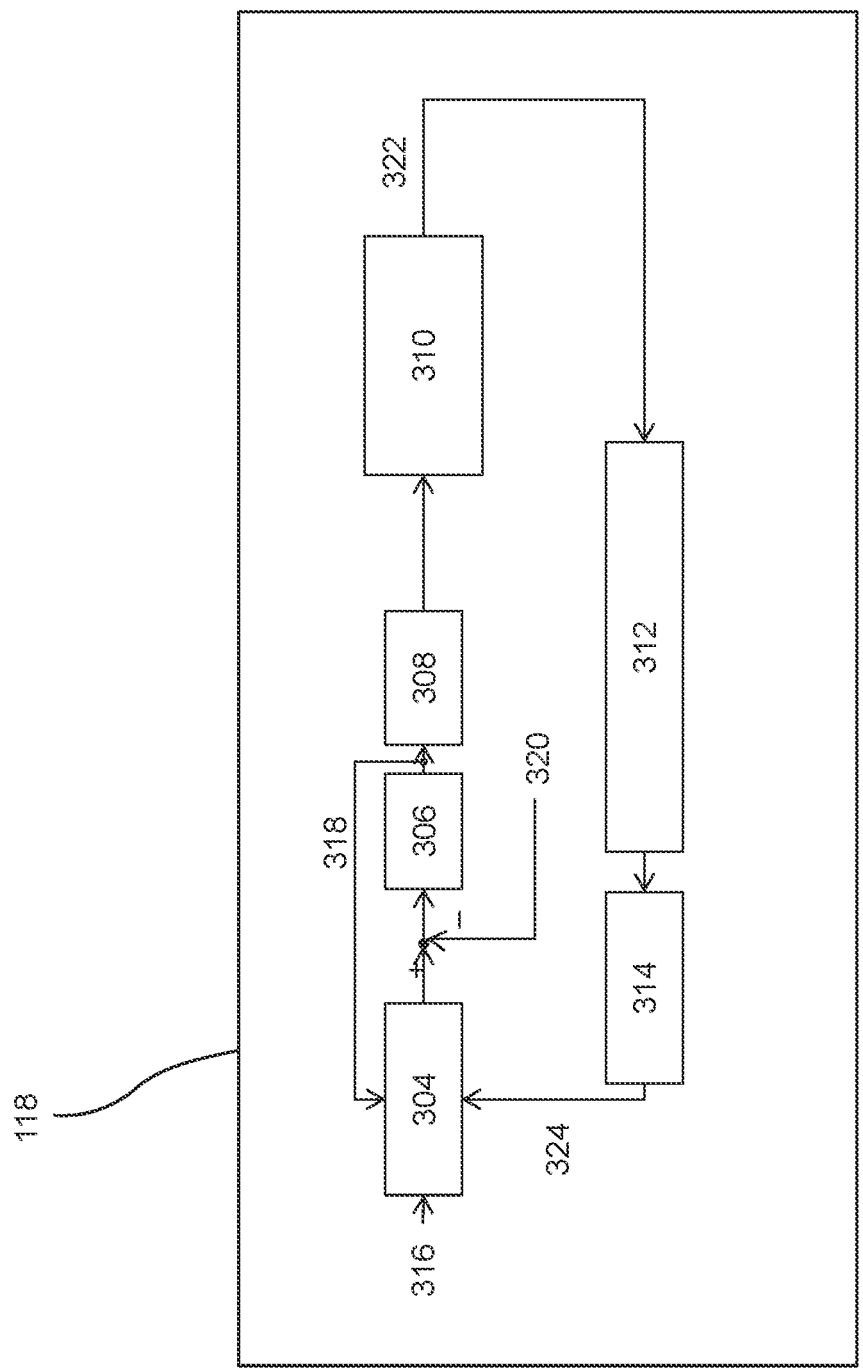
FIG. 9 shows a schematic exemplary view of a control device with a controller structure.

Such steeper second adjustment gradients 258 are possible, for example, with the control device 118 shown in FIG. 9 and the controller structure shown there. The angle of attack 304 is dependent on the wind speed 316, the rotation speed 318 and the pitch angle 324. The aerodynamic power determination 310 is determined by means of a rotor inertia 306 and a rotation speed measurement 308, and taking into account the electrical power 320. On the basis of the aerodynamic power 322, an adjustment gradient 312 can be determined which is provided to the pitch system 314. The pitch system 314 then sets a defined pitch angle 324 at the turbine. Accordingly, steeper adjustment gradients 312 are possible so that the wind turbine can be operated economically with smaller blade angles over a larger operating range.

Figure 10:
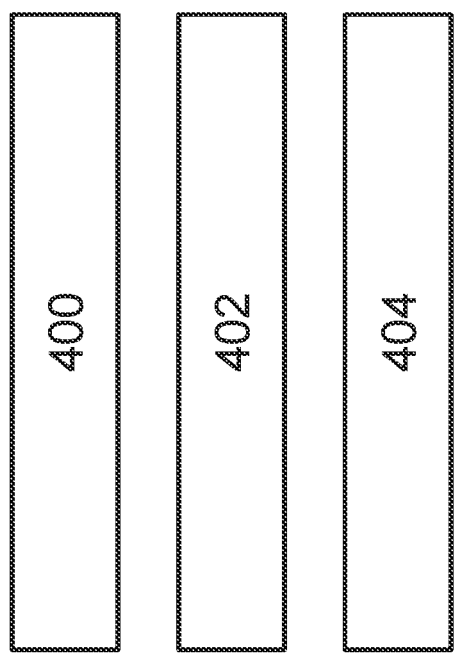
FIG. 10 shows a schematic method.

FIG. 10 shows a diagrammatic method. In step 400, an aerodynamic power of the rotor of the wind turbine is determined. In step 402, a nominal pitch angle is established as a function of the aerodynamic power. In step 404, the pitch angle is set to the established nominal pitch angle. Because the nominal pitch angle is determined as a function of the aerodynamic power and not with direct dependency on the electrical power, shorter delays occur and hence the installation can be operated economically for longer periods with a smaller pitch angle.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

LIST OF REFERENCE SIGNS

100 Wind turbine
102 Tower
104 Nacelle
106 Rotor
108 Rotor blades
110 Spinner
112 Rotor blade longitudinal axis
114 Pitch angle
116 Pitch drive
118 Control device
120 Leading edge
121 Profile chord
122 Trailing edge
124 Suction side
126 Suction-side flow
128 Pressure side
130 Pressure-side flow
132 Wind speed
134 Circumferential speed
136 Contact flow speed
138 Angle of attack
200 First controller structure
204 Angle of attack
206 Rotor inertia
208 Rotation speed measurement
210 Power specification
212 Power regulation
214 Nominal blade angle
216 Pitch system
218 Wind speed
220 Rotation speed
222 Electrical power
224 Pitch angle
230 Power
232 Time
234 Aerodynamic power
236 Electrical power
240 Power
242 Rotation speed
244 Power curve
246 Upper partial load range
250 Pitch angle
252 Power
254 Pitch angle curve
256 First adjustment gradient
258 Second adjustment gradient
260 Nominal pitch angle
304 Angle of attack
306 Rotor inertia
308 Rotation speed measurement
310 Determination of aerodynamic power
312 Nominal pitch angle
314 Pitch system
316 Wind speed
318 Rotation speed
320 Electrical power
322 Aerodynamic power
324 Pitch angle

The invention claimed is:

1. A method comprising:
setting a pitch angle of a rotor blade of a rotor of a wind turbine, wherein the rotor blade is configured to move rotationally about a rotor blade longitudinal axis for setting the pitch angle by a pitch drive, wherein the setting comprises:
determining an aerodynamic power of the rotor;
establishing a nominal pitch angle as a function of the aerodynamic power; and
setting the pitch angle to the established nominal pitch angle,
wherein the nominal pitch angle is established based on an aerodynamic power factor depicted in a portionally linear control function, wherein portions of the portionally linear control function are defined by the aerodynamic power, and the aerodynamic power factor is a power-dependent additional blade angle.

2. The method according to claim 1, wherein the aerodynamic power is determined from at least one of: a generated electrical power, a power loss, or an acceleration power of the rotor, wherein the aerodynamic power is a sum of the electrical power, the power loss, and the acceleration power.

3. The method according to claim 2, wherein the power loss is formed from a sum of a measurable power loss and an estimated power loss, wherein the estimated power loss is established by multiplying an estimation parameter by the electrical power.

4. The method according to claim 2, wherein the acceleration power is established from at least one of: an inertia moment of the rotor, an angular speed, or an angular acceleration, wherein the acceleration power is established by multiplying the inertia moment of the rotor by the angular speed or angular acceleration.

5. The method according to claim 1, wherein the nominal pitch angle is formed from an adjustment gradient, wherein the adjustment gradient is formed from the pitch angle and the aerodynamic power.

6. The method according to claim 1, wherein a minimum pitch angle is taken into account when establishing the nominal pitch angle, wherein the minimum pitch angle and the aerodynamic power factor are taken into account, wherein the minimum pitch angle and the aerodynamic power factor are added together to establish the nominal pitch angle.

7. The method according to claim 1, wherein the nominal pitch angle is established with the following portionally linear control function:

$$\alpha = \alpha_{min} + \begin{Bmatrix} 0, \text{ if } P_{aero} < P_{min,1}, \\ \frac{\partial \alpha}{\partial P_1} * (P_{aero} - P_{min,1}), \text{ if } P_{min,1} \leq P_{aero} < P_{min,2}, \\ \frac{\partial \alpha}{\partial P_1} * (P_{min,2} - P_{min,1}) + \frac{\partial \alpha}{\partial P_2} * (P_{aero} - P_{min,2}), \text{ if } P_{min,2} \leq P_{aero} \end{Bmatrix},$$

wherein α is the nominal pitch angle, $α_{min}$ is the minimum pitch angle, $P_{aero}$ is the aerodynamic power, $P_{min,1}$ is a first power threshold value, $P_{min,2}$ is a second power threshold value, $$\frac{\partial α}{\partial P_1}$$

is a first adjustment gradient, and $$\frac{\partial α}{\partial P_2}$$

is a second adjustment gradient.

8. The method according to claim 1, wherein at least one signal is filtered.

9. The method according to claim 1, wherein the pitch angle is set to the established nominal pitch angle if a difference between the established nominal pitch angle and a set pitch angle value is greater than a minimum setting angle.

10. The method according to claim 1, wherein the nominal pitch angle is established as a function of the aerodynamic power in an upper partial load range, wherein the upper partial load range lies between a full load range and a lower partial load range.

11. The method according to claim 1 wherein pitch angle is configured to reduce or prevent suction-side flow separation.

12. A method comprising:
setting a pitch angle of a rotor blade of a rotor of a wind turbine, wherein the rotor blade is configured to move rotationally about a rotor blade longitudinal axis for setting the pitch angle by a pitch drive, wherein the setting comprises:
determining an aerodynamic power of the rotor;
establishing a nominal pitch angle as a function of the aerodynamic power; and
setting the pitch angle to the established nominal pitch angle,
wherein a minimum pitch angle is taken into account when establishing the nominal pitch angle, wherein the minimum pitch angle and an aerodynamic power factor are taken into account, wherein the minimum pitch angle and the aerodynamic power factor are added together to establish the nominal pitch angle,
wherein the nominal pitch angle is established based on the aerodynamic power factor depicted in a portionally linear control function, wherein portions of the portionally linear control function are defined by the aerodynamic power, and the aerodynamic power factor is a power-dependent additional blade angle,
wherein the portionally linear function has a first portion, a second portion, and a third portion,
wherein the first portion is defined for an aerodynamic power which is less than a first power threshold value, wherein the nominal pitch angle in the first portion corresponds substantially to the minimum pitch angle,
wherein the second portion is defined for an aerodynamic power which is greater than or equal to the first power threshold value and less than a second power threshold value, wherein the nominal pitch angle in the second portion is a sum of the minimum pitch angle and a first aerodynamic power factor, wherein the first aerodynamic power factor is established as a function of at least one of: a first adjustment gradient, the aerodynamic power, or the first power threshold value, and
wherein the third portion is defined for an aerodynamic power which is greater than or equal to the second power threshold value, wherein the nominal pitch angle in the third portion is a sum of the minimum pitch angle and a second aerodynamic power factor, wherein the second aerodynamic power factor is established as a function of at least one of: a second adjustment gradient, the aerodynamic power, the second power threshold value, the first adjustment gradient, or a difference between the second power threshold value and the first power threshold value.

13. A control device comprising circuitry configured to set a pitch angle of a rotor blade for a rotor of a wind turbine by establishing a nominal pitch angle as a function of an aerodynamic power of the rotor and actuating a pitch drive to set the pitch angle of the rotor blade such that the pitch angle is set to the established nominal pitch angle by the pitch drive,
wherein the circuitry is configured to establish the nominal pitch angle based on an aerodynamic power factor depicted in a portionally linear control function, wherein the portions of the portionally linear control function are defined by the aerodynamic power, and the aerodynamic power factor is a power-dependent additional blade angle.

14. The control device according to claim 13, wherein the nominal pitch angle is formed from an adjustment gradient, wherein the adjustment gradient is formed from a pitch angle and the aerodynamic power.

15. A control system comprising:
the control device according to claim 13, and
a pitch drive for signal transmission for adjusting a set pitch angle of the rotor blade, and wherein the control device provides the nominal pitch angle to the pitch drive.

16. The control system according to claim 15, comprising a controller structure configured to control the pitch angle based on the nominal pitch angle, wherein the controller structure has at least a first unit for determining the aerodynamic power and a second unit for establishing the nominal pitch angle as a function of the aerodynamic power.

17. A wind turbine comprising:
a rotor having an adjustable-pitch rotor blade, wherein a pitch angle of the rotor blade is configured to be set by a pitch drive, and
a control device according to claim 13, wherein the control device is coupled to the pitch drive for signal transmission and is configured to provide the pitch drive with a nominal pitch angle which has been established as a function of an aerodynamic power, wherein the pitch drive is configured to set the pitch angle based on the nominal pitch angle.

* * * * *